United States Patent
Xiao

(10) Patent No.: US 12,208,712 B2
(45) Date of Patent: *Jan. 28, 2025

(54) ROTARY TOP ROD AND SAFETY SEAT

(71) Applicant: WONDERLAND SWITZERLAND AG, Steinhausen (CH)

(72) Inventor: Xiaohong Xiao, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/329,196

(22) Filed: May 25, 2021

(65) Prior Publication Data

US 2021/0370809 A1 Dec. 2, 2021

(30) Foreign Application Priority Data

May 26, 2020 (CN) .......................... 202010458700.0

(51) Int. Cl.
B60N 2/28 (2006.01)

(52) U.S. Cl.
CPC ......... B60N 2/2845 (2013.01); B60N 2/2821 (2013.01)

(58) Field of Classification Search
CPC ... B60N 2/2845; B60N 2/2821; B60N 2/2806
See application file for complete search history.

(56) References Cited

U.S. PATENT DOCUMENTS

| | | | |
|---|---|---|---|
| 8,322,788 B2 | 12/2012 | Williams et al. | |
| 8,573,695 B2 | 11/2013 | Van Geer et al. | |
| 8,973,991 B2 * | 3/2015 | Wuerstl | B60N 2/2821 297/253 |
| 9,365,135 B2 * | 6/2016 | Carpenter | B60N 2/2803 |
| 9,499,074 B2 * | 11/2016 | Strong | B60N 2/286 |
| 10,035,436 B2 * | 7/2018 | Zhou | B60N 2/2806 |
| 10,040,377 B2 * | 8/2018 | Mason | B60N 2/2845 |

(Continued)

FOREIGN PATENT DOCUMENTS

| | | |
|---|---|---|
| CA | 2940813 A1 | 3/2017 |
| CN | 1976830 A | 6/2007 |

(Continued)

OTHER PUBLICATIONS

Non Final Office Action issued to (counterpart U.S. Appl. No. 18/098,123) on Mar. 11, 2024.

(Continued)

*Primary Examiner* — Philip F Gabler

(57) ABSTRACT

The present disclosure provides a rotary top rod for being mounted on a safety seat. The rotary top rod includes a top rod body rotatably mounted on the safety seat, a locking assembly and an operating component, wherein the locking assembly includes a locking component and a fastening component, one of the locking component and the fastening component is mounted on the top rod body, the other one of the locking component and the fastening component is mounted on the safety seat, the locking component is engaged with the fastening component to fasten the top rod body to a predetermined position, the operating component is connected to the locking component, and the operating component is operated for driving the locking component so as to control engagement of the locking component and the fastening component.

17 Claims, 6 Drawing Sheets

(56) References Cited

U.S. PATENT DOCUMENTS

| | | | |
|---|---|---|---|
| 10,189,381 B2 * | 1/2019 | Williams | B60N 2/2806 |
| 10,336,219 B2 | 7/2019 | Mason et al. | |
| 10,406,947 B2 | 9/2019 | Anderson et al. | |
| 10,696,192 B2 | 6/2020 | Harmes, V et al. | |
| 10,737,593 B1 * | 8/2020 | Shellenberger | B60N 2/2806 |
| 11,299,074 B2 * | 4/2022 | Goare | B60N 2/2869 |
| 2011/0140491 A1 | 6/2011 | Williams et al. | |
| 2015/0183341 A1 | 7/2015 | Carpenter | |
| 2016/0046213 A1 | 2/2016 | Kirstein | |
| 2016/0347210 A1 | 12/2016 | Mason et al. | |
| 2018/0345827 A1 | 12/2018 | Anderson et al. | |
| 2021/0370808 A1 * | 12/2021 | Xiao | B60N 2/2845 |

FOREIGN PATENT DOCUMENTS

| | | |
|---|---|---|
| CN | 202243327 U | 5/2012 |
| CN | 102765337 A | 11/2012 |
| CN | 204398919 U | 6/2015 |
| CN | 204774756 U | 11/2015 |
| CN | 109747491 A | 5/2019 |
| CN | 305364393 S | 9/2019 |
| EP | 3564067 A1 | 11/2019 |

OTHER PUBLICATIONS

Notice of Allowance issued to (counterpart U.S. Appl. No. 17/329,195) on Oct. 26, 2022.
1st Office Action issued to German counterpart application (application No. 10 2021 006 666.9) on Feb. 22, 2024.
1st Office Action issued to China counterpart application (application No. 202010458700.0) on Mar. 22, 2024.
1st Office Action issued to China counterpart application (application No. 202010459845.2 on Mar. 22, 2024.
3rd Office Action issued to Canada counterpart application (application No. 3,119,788) on Sep. 24, 2024.

* cited by examiner

ROTARY TOP ROD AND SAFETY SEAT

CROSS-REFERENCE TO RELATED APPLICATION

This non-provisional application claims priority under 35 U.S.C. § 119(a) on Patent Application No(s). 2020104587000 filed in China on May 26, 2020, the entire contents of which are hereby incorporated by reference.

BACKGROUND OF THE INVENTION

1. Field of the Invention

The present disclosure relates to a safety seat, and in particular to a car safety seat having a rotary top rod.

2. Description of the Related Art

A child car seat is a seat used in a car for a child to sit, and the child is bound to the child car seat through a restraint device to ensure the safety of the child. Since the use of child car seats can minimize children's injuries in the event of an emergency braking or accidental collision in the car, child car seats have been accepted by consumers and are used all over the world.

For different ages of children, child car seats have different structures. Especially, the child car seat used by newborns generally includes a base and a baby cradle. The base is directly mounted on the seat of the car. A caregiver can put the baby in the cradle, and directly install the cradle on the base when traveling. However, the cradle and the base are separate structures, and only the bottom surface of the base is in contact with the car seat, which is not stable. Thus, in the prior art, the base is extended to the front side of the seat and a support rod is disposed at the front side of the seat (referring to the lower support leg in CN201930178362.3), or an end of the base is extended and a support bar is disposed at the end of the base (referring to the support leg 11 in CN201420862906. X and the support back in CN201930178362.3). However, these child car seats are too large to be easily transported.

Accordingly, there is a need to develop a car seat having a support structure to overcome the above-mentioned drawbacks.

BRIEF SUMMARY OF THE INVENTION

It is an object of the present disclosure to provide a rotary top rod and a safety seat having the rotary top rod. The rotary rod can be rotated around the safety seat and fixed in the use position for stabilizing installation of the safety seat and protecting safety of passengers, and can be folded up, when not in use, for saving space and facilitating transportation.

In order to achieve the above object, the present disclosure provides a rotary top rod for being mounted on a safety seat. The rotary top rod includes a top rod body rotatably mounted on the safety seat, a locking assembly and an operating component, wherein the locking assembly comprises a locking component and a fastening component, one of the locking component and the fastening component is mounted on the top rod body, the other one of the locking component and the fastening component is mounted on the safety seat, the locking component is engaged with the fastening component to fasten the top rod body to a predetermined position, the operating component is connected to the locking component, and the operating component is operated for driving the locking component so as to control engagement of the locking component and the fastening component.

In comparison with conventional technologies, the top rod support structure of the present disclosure is set as a rotatable structure, and through the combination of the locking component and the fastening component on the safety seat, the support structure can be fixed in a predetermined position when in use, and can be folded up for saving space and facilitating transportation when not in use.

Preferably, when the top rod body is disposed at the predetermined position, an end of the top rod body extends to an outer side of the safety seat to form a blocking portion protruding out of the safety seat. In this case, the rotary top rod is used as a safety bar of the seat for preventing the safety seat or the child from falling down, and can also play a buffering role between the seat of the car and the safety seat, such that the installation of the safety seat on the seat of the car is more stable.

Preferably, an acute angle is formed between a straight line, which is formed by an end of the blocking portion and a rotation portion of the top rod body, and a bottom surface of a base of the safety seat. A three-legged support structure is formed among the end of the blocking portion, the rotation portion of the top rod body and a rear end of the bottom surface of the base of the safety seat. The acute angle between a rotation arm formed by the top rod body and the bottom surface of the base can effectively prevent the rotation portion of the top rod body from receiving excessive force when the impact force is too large, thereby increasing the stability of the safety seat.

Preferably, the end of the top rod body is bent upward to extend, so as to increase the contact area between the blocking portion and the backrest of the seat of the car, thereby increasing the abutment capability of the top rod body.

Specifically, the top rod body comprises a rotation portion mounted on the safety seat, two rotating arms connected to the rotation portion and respectively disposed on both sides of the safety seat, and a blocking transverse arm respectively connected to an end of each of the two rotating arms, wherein the blocking portion is formed by the blocking transverse arm and the ends of the two rotating arms. In this case, the structure of the blocking portion is stable.

Specifically, the top rod body further comprises a mounting rod connected to the rotating arm or the blocking transverse arm, and the locking component is mounted on the mounting rod.

Specifically, the end of each of the rotating arms is inclined upward to form a bending part, and the mounting rod is connected to the bending part of each of the rotating arms, so as to further increase the rigidity of the blocking portion. Specifically, the locking component is mounted at the middle or a side of the mounting rod.

Preferably, the locking component comprises a clamping part and an elastic part, the clamping part is movably mounted on the top rod body or the safety seat and is engaged with the fastening component, the elastic part provides an elastic force for the clamping part to engage the clamping part with the fastening component, the operating component is connected to the clamping part, and the operating component is operated to control disengagement between the clamping part and the fastening component. In this case, when the top rod body rotates to the predetermined position, it can be automatically locked.

Specifically, the clamping part is rotatably connected on the top rod body or the safety seat.

Preferably, the fastening component is a fastening groove, and the locking component comprises a hook to be engaged with the fastening groove. Certainly, the fastening component can have other structures such as holes, bumps and clamping edges, and the locking component has structures such as corresponding bumps, holes, and clamping stages.

Specifically, a roller engaged with the hook is rotatably mounted in the fastening groove, or an arc-shaped fixed edge or a fixed cylinder matched with the hook is fixedly mounted in the fastening groove.

Specifically, the safety seat or the top rod body on which the fastening component is mounted comprises a receiving groove at a position where the locking component is engaged, an elastic arm extends outwards from one side of the receiving groove, a notch for the hook to extend is formed between an end of the elastic arm and the other side of the receiving groove, and the fastening groove is formed at a lower side of the end of the elastic arm.

Preferably, the operating component comprises a resilient push button. Certainly, the operating component can be a toggle component, a push-pull component, and so on.

Preferably, the top rod body is detachably mounted on the safety seat and is rotatable relatively to the safety seat.

The present disclosure also provides a safety seat, which includes the above rotary top rod, and the safety seat is provided with a fastening member engaged with the locking component. In the present disclosure, the top rod support structure is configured as a rotary structure. The support structure, when in sue, can be fixed at the predetermined position by the engagement of the locking component and the fastening component on the safety seat, and can be folded up for saving space and facilitating transportation when not in use.

Specifically, the safety seat comprises a seat body and a base for mounting the seat body, and the rotary top rod is rotatably mounted on the base. The seat body can be a baby cradle.

DETAILED DESCRIPTION OF THE INVENTION

Figure 1:
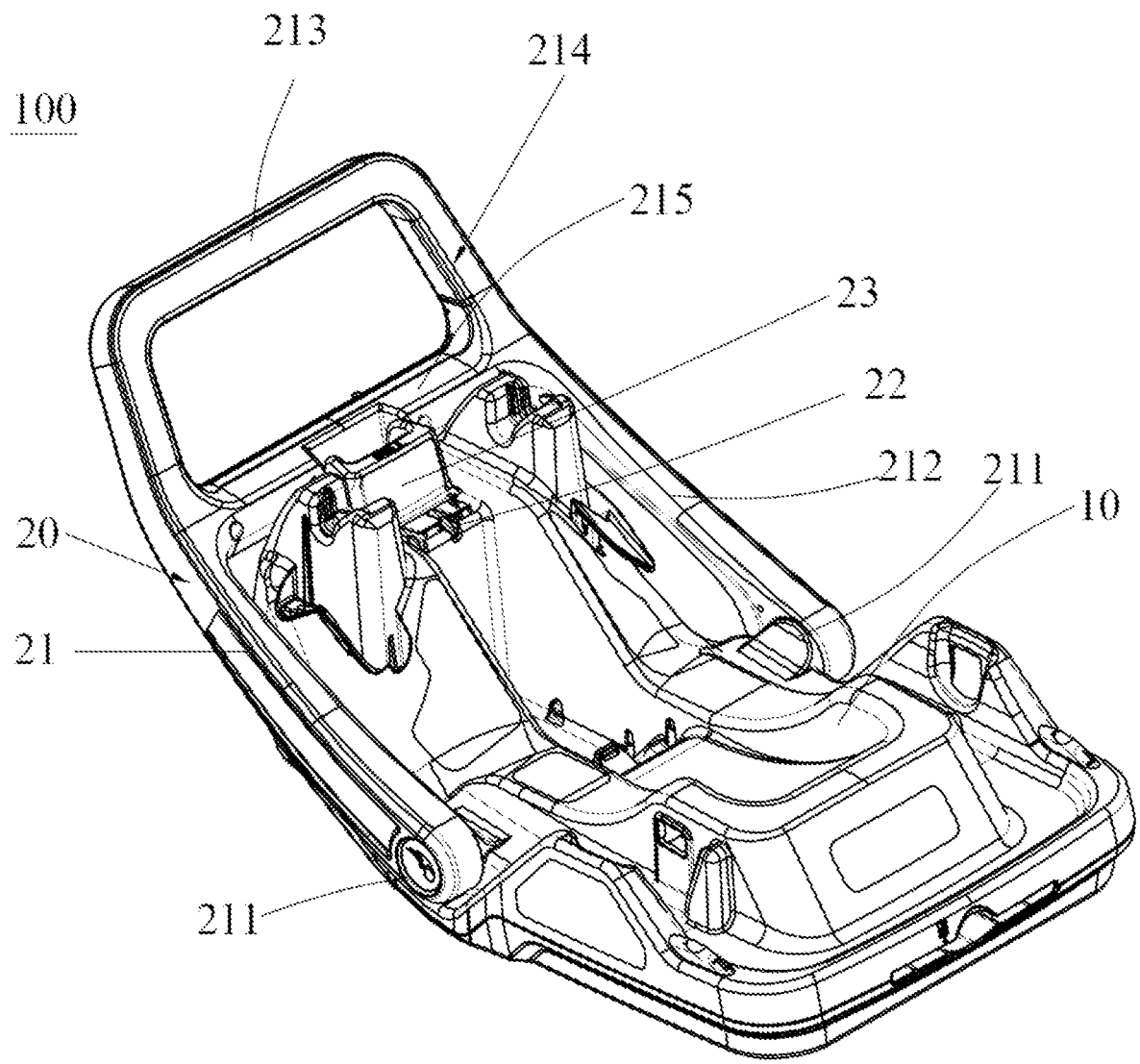
FIG. 1 is a perspective schematic view showing structure of a rotary top rod at a predetermined position in a safety seat according to the present disclosure.

In order to describe in detail the technical content, structural features, achieved objects and effects of the present disclosure, the following is a detailed description in conjunction with the embodiments and the accompanying drawings.

Please refer to FIG. 1 to FIG. 4. The present disclosure discloses a safety seat 100, on which a fastening component 11 and a rotary top rod 20 are mounted. The rotary top rod 20 includes a top rod body 21 rotatably mounted on the safety seat 100, a locking component 22 mounted on the top rod body 21 and an operating component 23 connected to the locking component 22. The locking component 22 is engaged with the fastening component 11 on the safety seat 100 to fasten the top rod body 21 to a predetermined position. The operating component 23 drives the locking component 22 so as to control engagement of the locking component 22 and the fastening component 11.

In the above embodiment, the locking component 22 is mounted on the top rod body 21, and the fastening component 11 is mounted on the safety seat 100. In another embodiment, the locking component 22 can be mounted on the safety seat 100 while the fastening component 11 is mounted on the top rod body 21, and at this time, the operating component 23 is disposed on the safety seat 100.

The safety seat 100 includes a seat body and a base 10. The fastening component 11 is disposed on the base 10, and the top rod body 21 is rotatably connected to the base 10. In this embodiment, the seat body is a baby cradle, and the baby cradle can be detachably mounted on the base 10. Certainly, the seat body can have other structures, and is not limited to this embodiment. For example, the seat body may be a seat body for infants or older children.

While the top rod body 21 is rotatably mounted on the safety seat 100, it is also detachably connected to the safety seat 100, so that the top rod body 21 can be detached from the safety seat 100, which increases flexibility for the user. In this embodiment, a rotatable member can be rotatably mounted on the positions where the top rod body 21 is mounted on both sides of the safety seat 100. A buckle assembly is disposed between the rotatable member and the two ends of the top rod body 21, wherein the buckle assembly has components engaged with each other, such that the two ends of the top rod body 21 can be mounted on the rotatable member and rotate relatively to the safety seat by the rotatable member. The buckle assembly is locked and unlocked through an operable hidden buckle. Certainly, other solutions for disassembly can be used, such as installation of threads and so on. In other embodiments, the top rod body 21 can be rotatably mounted on the safety seat 100 in a non-detachable manner. The above can be designed according to actual needs.

Figure 2:
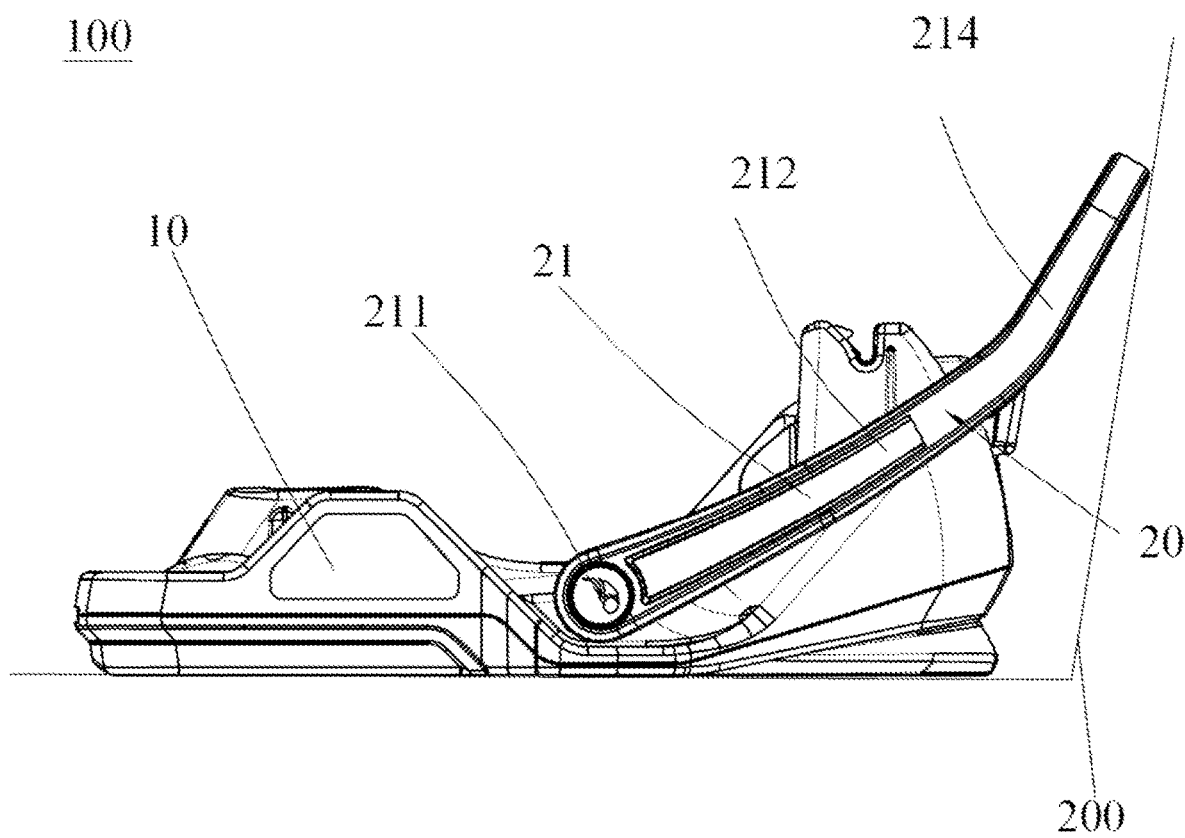
FIG. 2 is a side view of FIG. 1.

Referring to FIG. 2, in this embodiment, the rotary top rod 20 is a buffering rod mounted on the base 10 and against the backrest 200 of the seat of the car. When the top rod body 21 is at the predetermined position, its end extends to the outside of the safety seat 10 to form a blocking portion 214 protruding from the base of the safety seat 100, and the blocking portion 214 abuts against the backrest 200 of the seat of the car. In other embodiments, the top rod body 21 can be mounted on the base 10 and abut against a support bar of the backrest 200 of the seat of the car. When in the locked position, the end of the top rod body 21 extends to the lower side of the safety seat 10 to form a support bar which protrudes under the base of the safety seat 100 and supports between the safety seat 100 and the interior floor of the car. The above embodiments are just preferred embodiments of the present disclosure.

Referring to FIG. 2, an acute angle is formed between a straight line, which is formed by the end of the blocking portion 214 and a rotation portion of the top rod body 21, and a bottom surface of a base 10 of the safety seat 100. In this embodiment, the rotation portion of the top rod body 21 is disposed in the middle of the base 10. In other embodiments, the rotation portion of the top rod body 21 can be disposed at the front and middle positions of the base 10 to reduce the angle between the top rod body 21 and the bottom surface of the base 10. The angle between the top rod body 21 (a straight line formed by the front and rear ends of the top rod body 21) and the base 10 is preferably less than or equal to 45°. When the safety seat 100 is mounted on the seat of the car, a three-legged support structure is formed among the end of the blocking portion 214, the rotation portion of the top rod body 21 and the seat of the car, so as to increase the stability of the safety seat 100. Referring to FIG. 2, the end of the top rod body 21 (the end of the blocking portion 214) is higher than the rear edge of the base of the safety seat 100, so as to further increase the safety of the safety seat 100.

Referring to FIG. 2, the end of the top rod body 21 is bent upward to extend. That is, the blocking portion 214 is bent upward relatively to the front half of the top rod body 21 to increase the contact area between the blocking portion 214 and the backrest of the seat of the car, thereby increasing the abutment capability of the top rod body 21.

Figure 3:
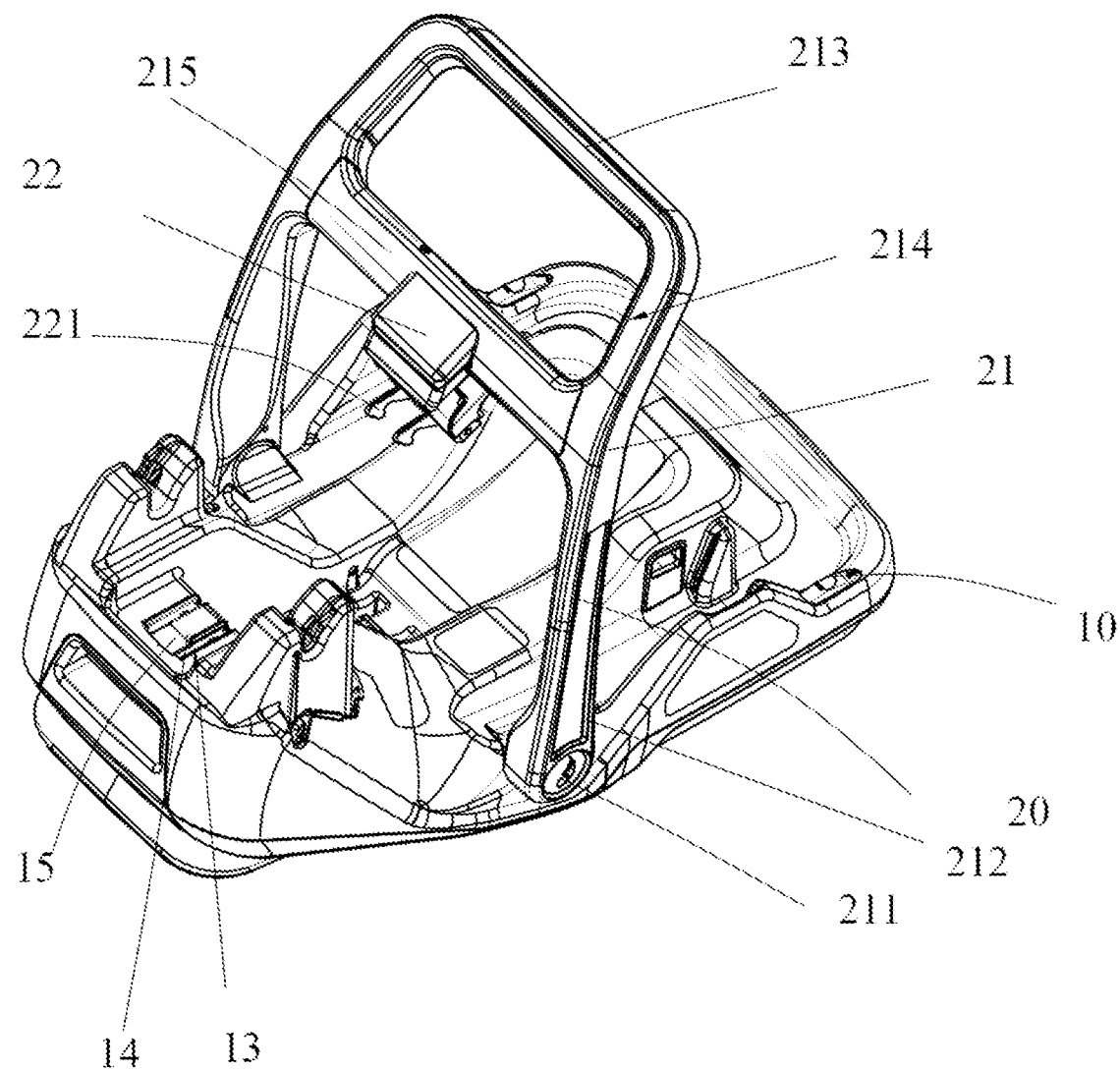
FIG. 3 is a perspective schematic view showing structure of the rotary top rod of the safety seat where the rotary top rod is separated from the predetermined position according to the present disclosure.
Figure 4:
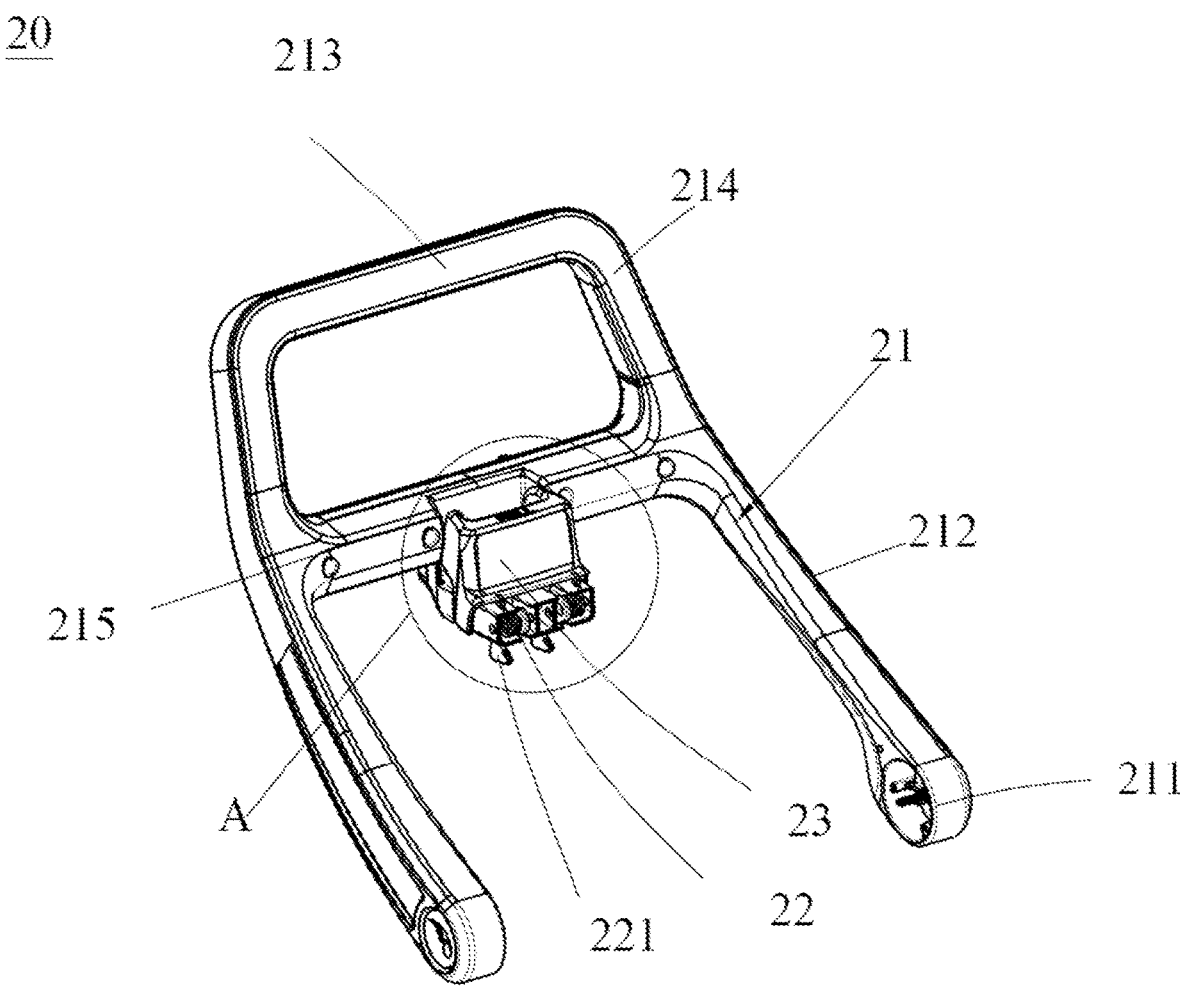
FIG. 4 is a perspective schematic view showing structure of the rotary top rod according to the present disclosure.

Referring to FIG. 2 to FIG. 4, the top rod body 21 includes a rotation portion 211 rotatably mounted on the seat 10, two rotating arms 212 connected to the rotation portion 211 and respectively disposed on both sides of the base 10, and a blocking transverse arm 213 respectively connected to an end of each of the two rotating arms 212, wherein the blocking portion 214 is formed by the blocking transverse arm 213 and the ends of the two rotating arms 212. This embodiment is just a preferred embodiment. The specific structure of the top rod body 21 can be designed according to requirements, and is not limited to the above-mentioned structure.

Referring to FIG. 3 and FIG. 4, the top rod body 21 further includes a mounting rod 215 connected to the rotating arm 212, and the locking component 22 is mounted on the mounting rod 215. In other embodiments, the mounting rod 215 can be connected to the blocking transverse arm 213, or connected to both the rotating arm 212 and the blocking transverse arm 213. Specifically, the end of each of the rotating arms 212 is inclined upward to form a bending part, and the mounting rod 215 is connected to the bending part of each of the rotating arms 212. In this embodiment, the mounting rod 215 is disposed in parallel to the blocking transverse arm 213. This embodiment is just a preferred embodiment.

Referring to FIG. 4, the locking component 22 is mounted at the middle of the mounting rod 215. In other embodiment, the locking component 22 can be mounted at the side of the mounting rod 215. In another embodiment, the locking component 22 can be mounted on the rotating arm 212.

Figure 5:
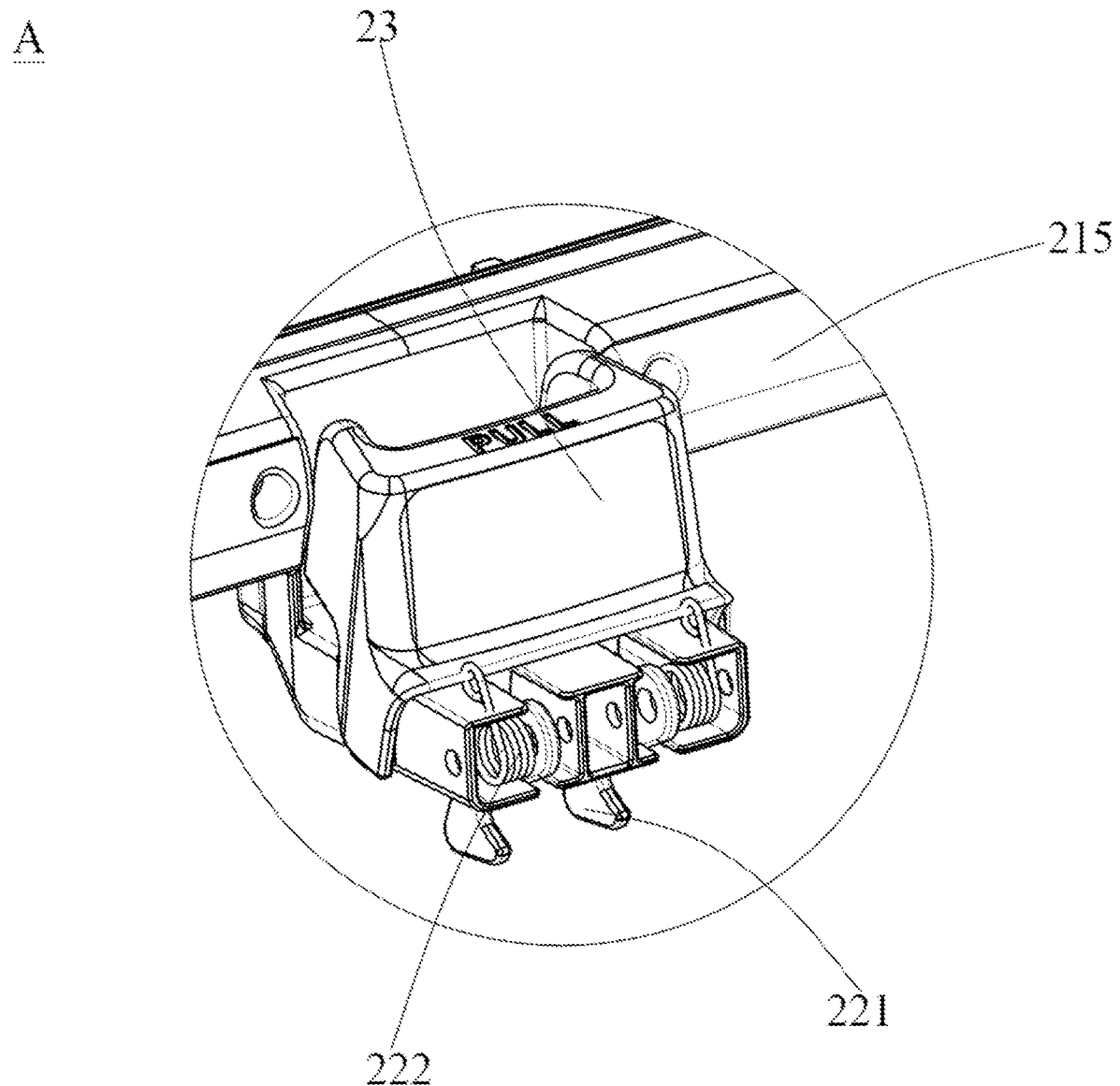
FIG. 5 is an enlarged view showing the part A in FIG. 4.
Figure 6:
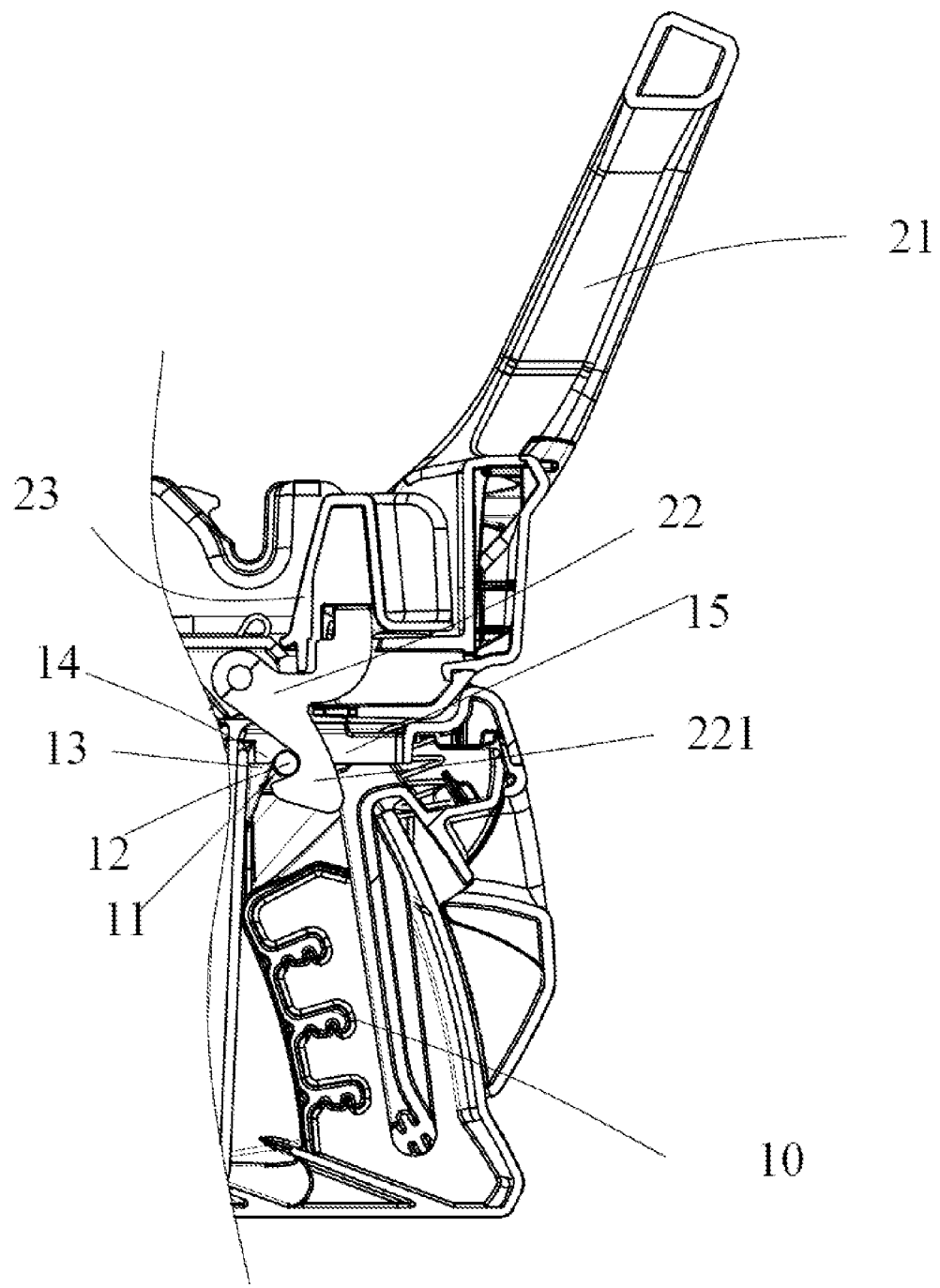
FIG. 6 is a partial cross-sectional view of FIG. 2.

Referring to FIG. 5 and FIG. 6, the locking component 22 includes a clamping part 221 and an elastic part 222. The clamping part 221 is movably mounted on the top rod body 21 and is engaged with the fastening component 11, the elastic part 222 provides an elastic force for the clamping part 221 to engage the clamping part 221 with the fastening component 11, the operating component 23 is connected to the clamping part 221, and the operating component 23 is operated to control disengagement between the clamping part 221 and the fastening component 11, when in use, to rotate the top rod body 21. When the top rod body 21 rotates the predetermined position, the clamping part 221 is driven by the elastic part 222 to approach the fastening component 11 and is engaged with the fastening component 11 to lock the top rod body 21 at the predetermined position. In this embodiment, the clamping part 221 is rotatably connected on the top rod body 21, and the clamping part 221 can be rotated relatively to the top rod body 21 under the driving of the elastic part 222 and the operating component 23, so as to be engaged with or disengaged from the fastening component 11. Specifically, the clamping part 221 includes a clamping end connected to the fastening component 11 and a connecting end abutting against the operating component 22 (it can also be connected by other connection methods, as long as the operating component 22 can drive the fastening component 11 to rotate). This embodiment is just a preferred embodiment, and the locking component 22 is not limited to the above structure. For example, the locking component 22 can be movably mounted on the top rod body 21 by abutting, and is driven by the operating component 23 to be engaged with or disengaged from the fastening component 11. In other embodiments, the clamping part 221 can be mounted on the safety seat 100 (for example, the base 10), while the fastening component 11 is mounted on the top rod body 21.

The operating component 23 includes a push button resiliently mounted on the top rod body 21, such that the push button can be resiliently reset. The operating component 23 abuts against the clamping part 221 and can be reset under the driving of the elastic part 222. Certainly, the operating component 23 can be a toggle component, a push-pull component, and so on, and is not limited the above structures. In this embodiment, the operating component 23 abuts against the locking component 22. Certainly, the operating component 23 can be fixedly connected to the locking component 22. Certainly, the push button can be resiliently mounted on the safety seat 100.

Referring to FIG. 3 to FIG. 5, in this embodiment, the fastening component 11 is a fastening groove, and the clamping part 221 is a hook to be engaged with the fastening groove. Certainly, the fastening component 11 can have other structures such as holes, bumps and clamping edges, and the locking component 22 has structures matched with the fastening component, such as bumps, holes, and clamping stages.

Referring to FIG. 6, a fixed cylinder (fixed rod) 12 is mounted in the fastening groove. When the clamping part 221 is connected to the fastening component 11, the recess of the hook is matched with and connected to the outer surface of the fixed cylinder 12, and the hook is driven by the operating component 23 to exit the fastening groove. The outer surface of the fixed cylinder 12 matches the shape of the inner surface of the hook to increase the stability of the engagement between the fixed cylinder and the hook. The arc-shaped matching surface can not only reduce the wear when the fastening groove and the hook are in contact, but also facilitate the separation of the hook from the fastening groove when the operating component is unlocked. When the hook is accidentally stuck, the frictional force of the hook sliding out of the fastening groove is effectively reduced. Certainly, the fixed cylinder 12 can be replaced by a roller that is rotatably mounted in the fastening groove, and when the hook exists the fastening groove, the hook can be in contact with the roller and drive the roller to roll when the hook is jammed to help the engaging hook to be disengaged from the fastening groove, which further reduces the friction force of the hook sliding out of the fastening groove. Certainly, the fixed cylinder 12 can be replaced by an arc-shaped fixed edge which matches the clamping part 221, and is not limited to the above-mentioned embodiments.

Referring to FIG. 3 and FIG. 6, the base 10 of the safety seat 10 comprises a receiving groove 13 at a position where the locking component 22 is engaged, an elastic arm 14 extends outwards from one side of the receiving groove 13, a notch 15 for the hook (clamping part 221) to extend is formed between an end of the elastic arm 14 and the other side of the receiving groove 13, and the fastening groove (fastening component 11) is formed at a lower side of the end of the elastic arm 14. In this embodiment, the fastening component 11 is mounted on the safety seat 11, and this embodiment is just a preferred embodiment. Certainly, the fastening component 11 can be mounted on the top rod body 21, and the clamping part 221 is mounted on the base 10 of the safety seat 100.

The present invention has been disclosed in preferred embodiments above. The above-mentioned embodiments should not be construed as limiting the scope of the present invention. It should be noted that all changes and substitutions equivalent to the above-mentioned embodiments should be included in the scope of the present invention.

What is claimed is:

1. A rotary top rod mounted on a safety seat, the rotary top rod comprising:
   a top rod body rotatably mounted on the safety seat and comprising:
      two rotating arms respectively disposed on both sides of the safety seat;
      a rotation portion rotatably mounted on the safety seat, wherein a first end of each of the two rotating arms are connected to the rotation portion;
      a blocking transverse arm respectively connected to a second end of each of the two rotating arms; and
      a mounting rod connected to a bending part of each of the rotating arms between the first end and the second end;
   a locking assembly comprising:
      a locking component; and
      a fastening component; and
   an operating component,
   wherein one of the locking component and the fastening component is mounted on the mounting rod of the top rod body, the other one of the locking component and the fastening component is mounted on the safety seat, the locking component is engaged with the fastening component to fasten the top rod body to a predetermined position, the operating component is connected to the locking component, and the operating component is operated for driving the locking component so as to control engagement of the locking component and the fastening component.

2. The rotary top rod of claim 1, wherein when the top rod body is disposed at the predetermined position, an end of the top rod body extends to an outer side of the safety seat to form a blocking portion protruding out of the safety seat.

3. The rotary top rod of claim 2, wherein an acute angle is formed between a straight line, which is formed by an end of the blocking portion and a rotation portion of the top rod body, and a bottom surface of a base of the safety seat.

4. The rotary top rod of claim 2, wherein the end of the top rod body is bent upward to extend.

5. The rotary top rod of claim 2, wherein the top rod body comprises a rotation portion mounted on the safety seat, two rotating arms connected to the rotation portion and respectively disposed on both sides of the safety seat, and a blocking transverse arm respectively connected to an end of each of the two rotating arms, wherein the blocking portion is formed by the blocking transverse arm and the ends of the two rotating arms.

6. The rotary top rod of claim 5, wherein the top rod body further comprises a mounting rod connected to the rotating arm or the blocking transverse arm, and the locking component is mounted on the mounting rod.

7. The rotary top rod of claim 6, wherein the end of each of the rotating arms is inclined upward to form a bending part, and two ends of the mounting rod are respectively connected to the bending part of each of the rotating arms.

8. The rotary top rod of claim 6, wherein the mounting rod is mounted between the two rotating arms and disposed in parallel with the blocking transverse arm, and the locking component or the fastening component is mounted at a middle or a side of the mounting rod.

9. The rotary top rod of claim 1, wherein the locking component comprises a clamping part and an elastic part, the clamping part is movably mounted on the top rod body or the safety seat and is engaged with the fastening component, the elastic part provides an elastic force for the clamping part to engage the clamping part with the fastening component in a locked position, the operating component is connected to the clamping part, and the operating component is operated to control disengagement between the clamping part and the fastening component.

10. The rotary top rod of claim 9, wherein the clamping part is rotatably connected to the top rod body or the safety seat.

11. The rotary top rod of claim 1, wherein the fastening component is a fastening groove, and the locking component comprises a hook to be engaged with the fastening groove for a snap connection.

12. The rotary top rod of claim 11, wherein a roller engaged with the hook is rotatably mounted in the fastening groove, or an arc-shaped fixed edge or a fixed cylinder matched with the hook is fixedly mounted in the fastening groove.

13. The rotary top rod of claim 11, wherein the safety seat or the top rod body on which the fastening component is mounted comprises a receiving groove at a position where the locking component is engaged, an elastic arm extends outwards from one side of the receiving groove, a notch for the hook to extend is formed between an end of the elastic arm and the other side of the receiving groove, and the fastening groove is formed at a lower side of the end of the elastic arm.

14. The rotary top rod of claim 1, wherein the operating component comprises a resilient push button.

15. The rotary top rod of claim 1, wherein the top rod body is detachably mounted on the safety seat and is rotatable relatively to the safety seat.

16. A safety seat, comprising a rotary top rod according to claim 1, and the safety seat is provided with a fastening member matched with the locking component for a snap connection.

17. The safety seat of claim 16, wherein the safety seat comprises a seat body and a base on which the seat body is mounted, and the rotary top rod is rotatably mounted on the base.

* * * * *